United States Patent Office 2,967,158
Patented Jan. 3, 1961

2,967,158

METHOD FOR PREPARATION OF ROUNDED CLAY-ACID MASSES

Thomas S. Malone, Bainbridge, Ga., assignor to Minerals & Chemicals Philipp Corporation, a corporation of Maryland No Drawing. Filed June 10, 1958, Ser. No. 740,994

5 Claims. (Cl. 252—450)

The present invention relates to an improved method for preparing active contact masses from clay, particularly kaolin clay, which masses are especially useful as catalysts in processes for cracking petroleum hydrocarbons to make gasoline. More specifically, the invention relates to an improved process for the preparation of relatively coarse catalyst particles from kaolin clay, wherein said catalyst particles are provided in rounded form. The rounded catalyst particles provided by the method of my invention are useful in those catalytic processes requiring catalyst particles ordinarily ranging in size from about 10-mesh to about 4-mesh.

In essence, the invention is in the nature of an improvement over the method disclosed in the copending U.S. application of Serial No. 490,128, filed February 23, 1955, by Alfred J. Robinson et al. An embodiment of the invention is an improvement over the method of copending application of Serial No. 499,515, filed April 5, 1955, by Alfred J. Robinson et al. These applications relate to the preparation of such contact masses from kaolin clay by a "dry" process. Briefly, the former application refers to a process in which kaolin clay is mixed with sufficient sulfuric acid to react with a substantial portion of the alumina of said clay, i.e., a 60 to 125 percent dosage of sulfuric acid of 90 to 100 percent concentration. The kaolin clay and acid are mixed to apparent homogeneity and the resulting mixture formed into angular pellets of appropriate size by any of the extrusion methods well-known to those skilled in the art. For good results in extruding the mix the volatile-matter should be about 30 to 65 percent, with the preferred value being in the neighborhood of 50 or 55 percent. The term "volatile-matter" (V.M.) refers to the weight percentage of the material eliminated by heating to essentially constant weight at about 1800° F. The plastic clay-acid mixture is forced through a die and the extrudate is cut to form pellets suitably about ⅛ to ½ inch in length and about ⅟₁₆ to ¼ inch in diameter. The pellets are then aged under suitable conditions to complete the reaction between the acid and the alumina of the clay; this aging also hardens the pellets. Without washing any of the water soluble reaction products therefrom, the aged pellets are calcined to eliminate substantially their sulfate content. The latter application relates to an improvement in the aging process of U.S. Patent No. 490,128, the improvement involving the aging of said masses in a hydrocarbon liquid which is substantially non-reactive with sulfuric acid at the elevated aging temperature employed in the aging step.

As previously noted, the process of the present invention is intended for use on kaolin clays. The chemical composition of kaolin clays is represented by the formula $Al_2O_3 \cdot 2SiO_2 \cdot xH_2O$, where $x$ is usually 2. The weight ratio of $SiO_2$ to $Al_2O_3$ indicated by this formula is 1.16 and kaolin clays normally possess $SiO_2/Al_2O_3$ ratios of from 1.0 to 1.5. Species of kaolin clay include kaolinite, nacrite, dickite, halloysite and anauxite.

To be acceptable, a cracking catalyst should possess activity and hardness and it must exhibit satisfactory catalyst life while in service. Catalyst life, as its name imples, simply refers to the period of economic usefulness of a catalyst in service. The reason for needing good cracking activity in a catalyst is self-evident and hardness is important in that it is responsible for minimization of attrition of the catalyst particles during the handling and utilization in the cracking unit. Attrition is detrimental since it results in loss of active catalyst particles as fines which are carried out in the effluent vapor, such loss increasing the cost of operation of a cracking unit. In fixed bed cracking processes, the hydrocarbon vapors are passed through a stationary bed of catalyst particles whereas in moving bed cracking processes, as exemplified by Thermofor catalytic cracking (T.C.C.) and Houdriflow operations, the catalyst particles gravitate towards the base of the reactor from whence they are conveyed through regenerators and back to the top of the reaction zone for another pass therethrough. The Houdriflow process differs from the T.C.C. process in the manner of conveying regenerated catalyst particles for recirculation to the reactor, a gas lift being used in the former case and elevators in the latter. It is evident that the catalyst particles in the moving bed processes in particular are subject to considerable attrition unless they possess considerable hardness. Improvement in catalyst hardness, particularly hardness as measured by attrition resistance, results in enhancement of the catalyst and represents a substantial advance in the art.

Although pelleted catalysts made in accordance with said copending applications are possessive of adequate hardness for most conditions of service, nevertheless, even nominal improvement in hardness, particularly attrition resistance, increases substantially the value of that catalyst.

Another important consideration of a granular catalyst is its ability to stack uniformly in a conversion unit so that channeling of fluid in contact with the catalyst bed is minimized. Since spherical catalysts are superior in this respect to cylinders, or other angular forms of pellets, many operators of conversion units prefer spherical catalysts to cylinders of equivalent hardness and activity. Still another advantage of the spherical contact mass or catalysts is its more desirable appearance.

Accordingly, it is an object of the instant invention to provide an improved method for preparing cracking catalysts from kaolin clays, which catalysts are superior in hardness to those obtained by the process of the copending applications.

Another object is the provision of a method for providing rounded catalyst particles which does not result in the simultaneous provision of fines.

It is another object of the invention to provide a practical method for obtaining spherical cracking catalysts from kaolin, which catalysts have improved hardness and appearance.

Other objects and features of the present invention will be apparent from the description which follows.

The present invention is the result of my discovery that if, in conjunction with the process for preparing a catalytically active material from kaolin clay by the process taught in the copending application of Serial No. 490,128 or Serial No. 499,515 the plastic clay-acid extrudate or pellet is rounded and, preferably is deformed into a sphere, prior to the aging thereof, ultimate catalyst particles of outstanding utility and improved hardness and appearance are provided. The improvement in hardness of the ultimate catalyst is such that attrition losses of said catalyst in service in the catalytic conversion unit are substantially reduced over losses manifest by catalysts made by the same activation process with omission of the novel rounding step provided by the subject invention. Catalyst spheres made by the improved process of the instant invention are useful in all of the known catalytic processes requiring relatively coarse catalyst particles, ranging in size ordinarily from about 10-mesh to about 4-mesh. The advantages realized by use of a catalyst provided by the method of the instant invention are most apparent when the catalyst is in service in a conversion unit in which said catalyst is subjected to a relatively high degree of attrition. The term "rounding" as used herein refers to the reforming of unrounded surfaces and/or edges of angular mass to convert said mass into substantially true spherical or spheroidal shape or a shape which is a deviation from spherical or spheroidal form, such as a barrel-like or ovate form. For simplicity's sake the term "spherical" as used hereinafter describes true spheres, spheroids or masses having substantially spherical or spheroidal form.

Stated in brief, according to the process of the subject invention, surfaces of the angular plastic clay-acid pellets provided in accordance with the method of the copending application of of Serial No. 490,128 are subjected, prior to the aging thereof and while still in a plastic condition, to a deforming force of a value somewhat above the yield point of the extrudate for sufficient time to round, and particularly to confer spherical shape upon said extrudate or pellets. The term "plastic" is used in its generally accepted sense, i.e., capable of being deformed continuously and permanently in any direction without rupture under a stress exceeding the yield value. The spherical masses are then aged under such conditions as to bring about substantially complete reaction of clay and acid, thereby destroying the plasticity of the rounded masses. After the aging step the solids are calcined under such conditions as to decompose the aluminum sulfate formed in situ to yield aluminum oxide and the oxides of sulfur, the latter passing off as vapor. There are many variations of procedure within the compass of my invention. For example, the rounded masses may be aged in any suitable manner to complete reaction between the acid and aluminum of said clay and the calcined catalyst particles may be treated by any process designed to improve the catalytic properties of the material or to otherwise improve the hardness of the particles. Also, any suitable material may be added to the clay-acid mass prior to the extrusion thereof which improves either the processing of the clay-acid mixture or the ultimate properties of catalyst masses produced therefrom, providing said added material does not destroy the plasticity of the clay-acid mixture.

It will be understood that the invention is not limited to any specific apparatus for performing the requisite deformation of the preshaped clay-acid mass and that many apparatuses are suitable for the purpose.

The rounding of the angular pellets may be carried out in the presence of air or in the presence of a suitable liquid. Pursuant to a preferred embodiment of the invention, the rounding is carried out in the presence of a hydrocarbon liquid. In the practice of this embodiment of the invention, the hydrocarbon liquid associated with pellets during their deformation may be maintained in contact with the deformed spheres during their aging, if so desired, as in accordance with the method of copending U.S. patent application of Serial No. 490,128.

The deformation of the plastic clay-acid pellets is accomplished by repetitively subjecting the plastic pellet to a mild compressive or shearing force or combination thereof with essentially no grinding or attrition being responsible for the streamlining. It is important that the rounding of the plastic extrudate by effected prior to the time at which substantial hardening and loss of plasticity of the extrudate takes place. For this reason it is essential that the extrudate does not stand in the presence of air for a considerable time, such as for several hours, since the plasticity will be destroyed or considerably reduced. Aside from the provision of an ultimate catalyst of a more acceptable appearance, catalysts produced by the process incorporating the improvement taught herein have enhanced resistance to attrition.

A particularly satisfactory method for rounding the angular pellets is to subject a suspension of the pellets in a nonreactive liquid, preferably a hydrocarbon oil, to flow in curvilinear path in a confined path at sufficient velocity to cause said pellets to be directed by centrifugal force to the periphery of the fluid stream whereby the impact of said pellets against the confining vessel results in their deformation. The specific gravity of the liquid should be less than that of the clay-acid mass to permit the pellets to travel at or near the periphery of the fluid stream. The specific gravity of the liquid relative to that of the clay-acid masses can be controlled to regulate the extent of deformation of the said clay-acid masses. The extent of deformation of clay-acid masses conveyed in a curvilinear path by a liquid will increase, all other influencing factors remaining constant, with increments of specific gravity differential between said liquid and said plastic masses.

If desired, rather than immersing the green plastic pellets in the liquid in which said pellets are conveyed during rounding, the liquid may be sprayed in suitable proportion on the clay-acid pellets as they issue from the extruder.

The ultimate shape the pellets acquire as a result of the deformation will depend, inter alia, on the yield point of the plastic mass, the duration of the deforming force, the strength of that force, the number of times the force is applied to the mass, the directional selectivity of the force with respect to surfaces of the pellet and relative dimensions of the pellet. For example, a substantially square or cylindrical extrudate in which the length approximates the diameter will tend to acquire the form of a true spherical mass whereas elongated extrudates are more readily deformed into spheroidal masses. Non-uniform application of force is conducive to the formation of rounded masses which deviate from true spherical or spheroidal shape.

Pursuant to one embodiment of my invention, a liquid, preferably a hydrocarbon liquid, is sprayed on the clay-acid pellets as they issue from the extruder, suitably at the rate of about 15 pounds of hydrocarbon liquid per pound of extrudate, thereby to provide a mixture of plastic coherent pellets consisting of a clay-acid mixture in which the acid has not as yet substantially reacted with the acid reactable constituents of the clay. The liquid component of the mixture may be any non-aqueous material or combination of materials that is nonreactive with the clay-acid mixture that composes the pellets and that has a low vapor pressure at room temperature or at the temperature at which the mixture may be subjected during the deformation process. The liquid should preferably have Newtonian flow at the temperature of the processing, although slight deviations therefrom may not be deleterious or hinder the satisfactory performance of that liquid in the process. For reasons to be brought out, the preferred liquid for the purpose is a hydrocarbon oil which is substantially nonreactive with sulfuric acid at the aging temperature to which said oil is subjected in a subsequent operation. Examples of readily available hydrocarbon liquids which are suitable for the process are saturated aliphatic high molecular weight hydrocarbons which have been treated with sulfuric acid for removal of sulfonatable components such as, for example, certain white mineral oils, gas oil and mixtures thereof. Kerosene can also be used.

Th mixture of pellets in liquid conveying medium may be passed into the chamber of a centrifugal-type pump having an open impeller so that no disintegration of the pellets can be effected by impact of the impeller on the pellet. I have found a Wemco torque-flow solids pump to be very satisfactory for the purpose. The solids content of the mixture and the vehicle of the mixture are selected to provide a mixture having the characteristics of fluid flow. The pump is preferably operated under such conditions that the mixture circulates therethrough in streamline flow, this depending, inter alia, on the density of the mixture and the velocity of the mixture as it passes through the circular chamber. By this practice the deformable pellets roll along the solid walls of the chamber and some incipient rounding of the sharp or blunted portions of the plastic clay-acid pellets preferably takes place. It is preferable that the flow of mixture throughout the pump be at sufficiently high velocity to result in flow which is essentially streamlined, rather than turbulent. Mild turbulence of the liquid in which the plastic masses are conveyed will not be deleterious, particularly if the masses do not have a very low yield point. In general, the optimum velocity and flow conditions are best determined by inspection of the masses produced under any set of operating conditions. The mixture issuing from the pump is subjected to further flow, preferably streamline flow, in a curvilinear or helical path to promote further rounding of the pellets, any suitable apparatus for providing this curvilinear path being satisfactory. The length of the helical path through which the mixture of semi-rounded pellets in hydrocarbon liquid must pass to achieve the desired rounding will of course depend on such factors as the velocity of the mixture through the path and the dimensions of the conduit through which the mixture passes. It will be understood that the conduit through which the mixture passes in a helical path need not be a true helix; satisfactory results are obtained by passing the mixture through an elongated cylinder under such flow conditions that the mixture inherently follows a curved path in streamline flow. In this step, as in the passage of the mixture through the pump, substantial turbulence is to be avoided.

The term "streamline flow" as used herein is briefly defined as steady flow past a solid body in which the direction at every point remains unchanged as time goes on. (See Chemical Engineers' Handbook, Perry, page 799, 1951 edition.) The transition from streamline flow to turbulent flow occurs at the critical velocity, the term generally being used to refer to the average linear velocity above which a given fluid, at a given temperature and pressure, flowing in a given apparatus will move in turbulent flow, and below which velocity the flow is streamline. This critical velocity can be calculated from the Reynolds criterion, which is explained in detail in Perry's Chemical Engineers' Handbook.

As has been mentioned, it is desirable that the plastic clay-acid masses be provided as a relatively dilute suspension in the hydrocarbon liquid. However, when by the choice of hydrocarbon liquid carrier or concentration of solids in the mixture the flow is non-Newtonian, the calculation of critical velocity should account for this factor. The method of correction is known to those skilled in the art, and is described in any good textbook on hydrodynamics. It is preferable to provide a mixture in which the viscosity is sufficiently low that the requisite velocity to provide streamline flow be provided without recourse to excessive applied mechanical forces.

The mixture, after passage through the pump of the character above-described, may issue tangentially into the base of an elongated vertical chamber, the tangential entry being provided to avoid turbulence of the mixture in the chamber. The mixture, as it is pumped upward through the chamber, follows a substantially helical path during its high velocity passage through said chamber. An agitator may be used to encourage the upward flow of the mixture through the chamber and to minimize the tendency of the pellets to gravitate to the bottom of the chamber. Alternatively, the mixture may be pumped at high velocity through one or a series of helical coils to accomplish rounding of the pellets. Another effective method of deforming the pellets is to pass the mixture through a battery of torque-flow pumps connected in parallel, each pump preferably being of the character above-described whereby each pump provides a helical path for the mixture.

Still another method for rounding the extrudate involves bouncing extruded pellets on which a thin film of oil has been sprayed. One method for rounding involves subjecting discrete pellets to a vibratory impulse of sufficient amplitude to produce the requisite deformation. This may be accomplished by bouncing discrete pellets on a substantially horizontal surface inclined somewhat downward and suitably mounted to vibrate in a horizontal plane. Pellets fed to the highest elevation of the vibrating surface progress, while bouncing, down the incline to a suitable receiving device and during their course are rounded. The vibrating surface may be solid or reticulated.

When the pellets are rounded in the presence of a nonreactive hydrocarbon liquid by any of the methods described, the sphered masses may, if desired, be aged in the presence of that oil by the method taught in the copending application of Serial No. 499,515. Accordingly, spherical masses entrained in the oil are conveyed to a suitable aging apparatus, with the solids content of the mixture adjusted when desired by partial removal or addition of oil. Oil aging is preferably accomplished in a screw conveyor, although any well-known means for maintaining the rounded clay-acid mixture in the hot oil for the desired length of time would obviously be suitable. The oil bath may be static or circulating for the purpose.

This example illustrates the superiority of catalysts prepared from kaolin clay by the process of the instant invention over catalysts prepared from kaolin in which the step of sphering of the clay-acid extrudate is omitted.

Water-washed Georgia kaolin clay of about 14 percent V.M. was continuously mixed with sulfuric acid of about 93.2 percent concentration, the amount of acid used being equivalent to a dosage of about 80 percent. The starting clay had the following approximate analysis (V.F. basis).

| | Percent |
|---|---|
| $SiO_2$ | 52.10 |
| $Al_2O_3$ | 45.34 |
| $Fe_2O_3$ | 0.34 |
| $TiO_2$ | 2.22 |

The clay and acid were mixed by pugging and the mixture was continuously formed into pellets about 3/16 inch in diameter and about 3/16 inch long by feeding the pugged mixture to an auger mill which extruded said mixture through a die plate. The extruded material was cut into pellets of the size above-noted by cutter blades upon emergence of the extrudate from the die plate.

A portion of the pellets were aged for about 3 hours in a hydrocarbon oil (white mineral oil) maintained at a temperature of about 315° F. The aged pellets were then separated from the oil associated therewith by screening and the pellets were conveyed to a calciner. Steam and hot flue gases containing reducing components (products from the combustion of gas in an atmosphere deficient in oxygen) were continuously circulated through the bed of pellets in the calciner, thus supplying the heat requisite for desulfation of said aged pellets. During operation the temperature in the calciner averaged about 1450° F.

To compare the impact hardness of catalysts prepared as above-described with catalysts produced by a process including the supplementary step of rounding the clay-acid pellets prior to aging, a portion of the pellets prepared as above-described were conveyed in oil through a torque-flow pump and helical tube according to the process of the instant invention.

To accomplish this a mixture was prepared using about 1 part by weight of clay-acid pellets per 15 parts of hydrocarbon oil, the oil being a portion of the white mineral oil used in the aging process hereinabove described. The pellets were added to the oil immediately after their formation to avoid premature hardening thereof with concomitant loss of plasticity. The mixture was drawn through 26 feet of helical coil having an inside diameter of about 2 inches by means of a 3" Wemco torque-flow solids pump, operated at 744 r.p.m. and delivering 115 g.p.m. The masses discharged from the coil outlet were essentially truly spherical in shape. The spheres were aged and calcined under the same conditions employed in aging and calcining the unrounded pellets.

The above-described catalyst pellets and my novel catalyst spheres were evaluated for impact hardness by the following air-jet attrition test, which was designed to evaluate the resistance of the catalyst masses to attrition under conditions simulating those to which catalyst masses are subject in moving bed cracking units of the Houdriflow type. In the accelerated air-jet test a 30 gram catalyst sample previously screened on a No. 7 U.S. standard screen and heat treated for 3 hours at 1050° F. and cooled in a desiccator was placed in an inverted one-liter Erlenmeyer flask. The flask had a one-inch hole centered in its bottom which was covered by a ten-mesh screen. Dry air was admitted for one hour through a concave stopper at the rate of 6.1 s.c.f.m. After running for one hour, the material was rescreened on a No. 10 U.S. screen and the retained material weighed. Attrition values are reported as the weight percent lost.

Catalyst spheres had hardness values, as measured by the air-jet attrition test above-described, within the range of 5.3% to 7.0%, with a value of about 6.1% being the average of six tests. Catalyst pellets produced by the method of this example (but omitting the sphering step of the subject invention) had satisfactory catalytic activity and considerably lower attrition resistance when measured by the same air-jet procedure, 17.0% being the average weight percent of sample lost during the test.

In another example of my invention a kaolin clay-acid extrudate was prepared, as in the first example, employing the same materials and in like proportions.

A fraction of the extrudate was aged and calcined as in the first example. The average jet hardness of this control extrudate was 26.

Another fraction of the extrudate was rounded in an oil cyclone, hereinafter described, and thereafter aged in white mineral oil and calcined under the same conditions as the control. The jet hardness of the rounded material was 17, a 36% improvement in hardness, as measured by the air-jet attrition test described in the first example.

In rounding the pellets in the oil cyclone, white mineral oil was pumped, with an Allis-Chalmers pump, through three spaced tangential inlet pipes, into an 8" pipe approximately 3' long and having a solid bottom. The pellets were fed into the unit through a central feed pipe and discharged at a point near the bottom of the 8" pipe. The pellets after discharge from the feed pipe were picked up by the oil and given a spiral motion upward through the pipe during which rounding of the pellets took place. The rounded pellets were withdrawn from the unit at a point adjacent the top of the unit and recycled two times.

Pellets were fed into the unit at the rate of 30#/min. The oil pressure was 40 p.s.i.g.

Another fraction of the extrudate was soaked with white mineral oil, drained to provide a thin film of oil on the extrudate and rounded by bouncing the pellets on a vibrating table. The jet hardness of the resultant rounded spheres after aging and calcination was 9. The rounding operation was conducted by placing extruded pellets at one end of a substantially horizontal slightly inclined metal trough and moving the pellets to the other end of the trough by vibration of bin vibrators.

It will be understood that the invention is susceptible to numerous variations and is not limited to the use of the particular equipment used in rounding as hereinabove described.

I claim:

1. In the method for the preparation of contact masses from kaolin clay comprising the steps of mixing the clay with from about 60 to 125 percent dosage of concentrated sulfuric acid, extruding the mixture to form pellets of plastic consistency, aging the pellets to complete the reaction between the acid and the alumina of said clay, thus converting the pellets to a nonplastic state, and desulfating said aged pellets by calcining them at an elevated temperature, the improvement comprising deforming said pellets while still in the plastic state to an extent sufficient to impart substantial roundness to said pellets.

2. In the method for the preparation of contact masses from kaolin clay comprising the steps of mixing the clay with from about 60 to 125 percent dosage of concentrated sulfuric acid, extruding the mixture to form pellets of plastic consistency, aging the pellets to complete the reaction between the acid and the alumina of said clay, thus converting the pellets to a nonplastic state, and desulfating said aged pellets by calcining them at an elevated temperature, the improvement comprising subjecting surfaces of each of said pellets, while said pellets are still in the plastic state and prior to the aging thereof, to successive deforming forces of a value not to exceed substantially the yield point of said pellets and for a time sufficient to impart substantial roundness to said pellets.

3. In the method for the preparation of contact masses from kaolin clay comprising the steps of mixing the clay with from about 60 to 125 percent dosage of concentrated sulfuric acid, extruding the mixture to form pellets of plastic consistency, aging the pellets to complete the reaction between the acid and the alumina of said clay, thus converting the pellets to a nonplastic state, and desulfating said aged pellets by calcining them at an elevated temperature, the improvement comprising intimately associating said pellets while still in the plastic state with a hydrocarbon liquid which is essentially nonreactive with said pellets, subjecting surfaces of each of said pellets in the presence of said hydrocarbon liquid to successive deforming forces of a value not to exceed substantially the yield point of said pellets for a time sufficient to impart substantial roundness to said pellets.

4. In the method for the preparation of contact masses from kaolin clay comprising the steps of mixing the clay with from about 60 to 125 percent dosage of concentrated sulfuric acid, extruding the mixture to form pellets of plastic consistency, aging the pellets to complete the reaction between the acid and the alumina of said clay, thus converting the pellets to a nonplastic state, and desulfating said aged pellets by calcining them at an elevated temperature, the improvement comprising forming a free flowing suspension of said pellets while still in the plastic state in a hydrocarbon liquid which is essentially nonreactive with said pellets and which has a specific gravity lower than that of said pellets, circulating said suspension in a substantially helical path at a velocity and for a time sufficient to impart substantial roundness to said pellets.

5. In the method for the preparation of contact masses from kaolin clay involving the steps of mixing the clay with from about 60 to 125 perecnt dosage of concentrated sulfuric acid, extruding the mixture to form pellets of plastic consistency, aging the pellets to complete the reaction between acid and alumina of said clay, thus converting the pellets to a nonplastic state, and desulfating said aged pellets by calcining them at an elevated temperature, the improvement comprising contacting said pellets while still in the plastic state with sufficient mineral oil to form a readily flowable mixture, and subjecting said pellets while conveyed in said mineral oil to a deforming force not to exceed substantially the yield value of said pellets for time sufficient to impart substantial roundness to said pellets.

References Cited in the file of this patent

UNITED STATES PATENTS

| | | |
|---|---|---|
| 1,781,265 | Baylis | Nov. 11, 1930 |
| 2,485,626 | Mills | Oct. 25, 1949 |
| 2,686,161 | Stewart | Aug. 10, 1954 |
| 2,805,206 | John | Sept. 3, 1957 |
| 2,831,652 | Gemperle | Apr. 22, 1958 |